(12) United States Patent
Yukimasa

(10) Patent No.: US 10,990,618 B2
(45) Date of Patent: Apr. 27, 2021

(54) COMPUTER-IMPLEMENTED METHOD FOR QUESTION ANSWERING SYSTEM

(71) Applicant: Panasonic Intellectual Property Corporation of America, Torrance, CA (US)

(72) Inventor: Akinori Yukimasa, Nara (JP)

(73) Assignee: PANASONIC INTELLECTUAL PROPERTY COPRORATION OF AMERICA, Torrance, CA (US)

( * ) Notice: Subject to any disclaimer, the term of this patent is extended or adjusted under 35 U.S.C. 154(b) by 212 days.

(21) Appl. No.: 15/974,967

(22) Filed: May 9, 2018

(65) Prior Publication Data

US 2018/0349475 A1 Dec. 6, 2018

Related U.S. Application Data

(60) Provisional application No. 62/512,767, filed on May 31, 2017.

(30) Foreign Application Priority Data

Nov. 30, 2017 (JP) .............................. JP2017-230234

(51) Int. Cl.
*G06F 16/332* (2019.01)
*G06F 16/2452* (2019.01)
*G06F 16/903* (2019.01)
*G06Q 50/00* (2012.01)

(52) U.S. Cl.
CPC .... *G06F 16/3329* (2019.01); *G06F 16/24522* (2019.01); *G06F 16/90335* (2019.01); *G06Q 50/01* (2013.01)

(58) Field of Classification Search
CPC .......... G06F 16/3329; G06F 16/90335; G06F 16/24522; G06Q 50/01
See application file for complete search history.

(56) References Cited

U.S. PATENT DOCUMENTS

| | | | |
|---|---|---|---|
| 8,756,501 B1 * | 6/2014 | Karam | G06F 3/04842 715/700 |
| 2005/0272413 A1 * | 12/2005 | Bourne | H04L 51/32 455/415 |
| 2007/0271237 A1 | 11/2007 | Chang | |
| 2010/0131265 A1 * | 5/2010 | Liu | G06F 16/3329 704/9 |

(Continued)

FOREIGN PATENT DOCUMENTS

| | | |
|---|---|---|
| JP | 2007-310862 | 11/2007 |
| JP | 2012-190244 | 10/2012 |

*Primary Examiner* — James Trujillo
*Assistant Examiner* — Michal Bogacki
(74) *Attorney, Agent, or Firm* — Wenderoth, Lind & Ponack, L.L.P.

(57) ABSTRACT

A computer-implemented method includes: acquiring question information and question area information from a questioner terminal; acquiring pieces of answer area information from an answerer database; selecting one or more answerer terminals from among terminals based on the pieces of answer area information and the question area information; transmitting the question information to the answerer terminals; acquiring at least one piece of answer information from at least one of the answerer terminals; and transmitting the at least one piece of answer information to the questioner terminal.

14 Claims, 14 Drawing Sheets

(56) References Cited

U.S. PATENT DOCUMENTS

| | | | |
|---|---|---|---|
| 2013/0073508 A1* | 3/2013 | Zhou | H04L 65/1083 |
| | | | 706/47 |
| 2013/0246392 A1* | 9/2013 | Farmaner | G06F 16/2453 |
| | | | 707/713 |
| 2014/0115042 A1* | 4/2014 | Yin | G06Q 50/01 |
| | | | 709/203 |
| 2015/0149932 A1* | 5/2015 | Yamada | G06Q 30/02 |
| | | | 715/753 |
| 2016/0111010 A1* | 4/2016 | Adachi | G09B 7/00 |
| | | | 434/362 |
| 2017/0032253 A1* | 2/2017 | Maekawa | G06N 5/022 |

* cited by examiner

COMPUTER-IMPLEMENTED METHOD FOR QUESTION ANSWERING SYSTEM

BACKGROUND

1. Technical Field

The present disclosure relates to an information processing method executed by a computer in a question answering system.

2. Description of the Related Art

In a related technique, it is known to provide information about a particular area to a tourist or a visitor to the area (see, for example, Japanese Unexamined Patent Application Publication No. 2012-190244).

SUMMARY

In one general aspect, the techniques disclosed here feature a computer-implemented method including: (A) acquiring, from a questioner terminal, question information indicating a question of a questioner and question area information indicating a question area about which the question asks; (B) acquiring, from an answerer database, pieces of answer area information respectively indicating answer areas about which answerer candidates are respectively able to answer; (C) selecting one or more answerer terminals from among terminals of the answerer candidates, based on the acquired pieces of answer area information and the acquired question area information; (D) transmitting, to the selected answerer terminals, the acquired question information; (E) acquiring, from at least one of the selected answerer terminals, at least one piece of answer information indicating at least one answer given to the question by at least one answerer; and, (F) transmitting, to the questioner terminal, the acquired piece of answer information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
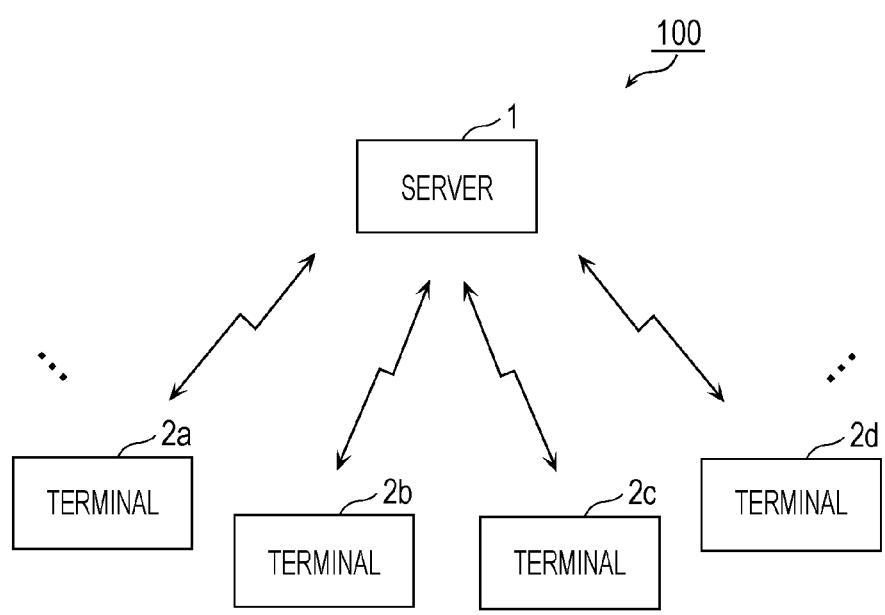
FIG. 1 is a block diagram illustrating a configuration of an information providing system according to an embodiment.

In an aspect, the present disclosure provides a computer-implemented method including (A) acquiring, from a questioner terminal, question information indicating a question issued by a questioner and question area information indicating a question area about which the question asks; (B) acquiring, from an answerer database, a plurality of pieces of answer area information respectively indicating a plurality of answer areas about which a plurality of answerer candidates are respectively able to answer; (C) selecting, based on the plurality of pieces of answer area information and the question area information, one or more answerer terminals from a plurality of terminals respectively related to the plurality of answerer candidates; (D) transmitting the question information to the one or more answerer terminals, (E) acquiring, from at least one of the one or more answerer terminals, at least one piece of answer information indicating at least one answer given to the question by at least one answerer; and (F) transmitting the at least one piece of answer information to the questioner terminal.

In this method, answerer candidates are screened depending on a question area about which a questioner wants to ask, and thus it is possible to efficiently achieve good matching between a questioner and an answerer. This makes it possible to reduce the occurrence of a useless conversation or the like between a questioner and an answerer due to mismatching between the questioner and the answerer, which allows a reduction in a processing load on a computer (such as a server) and/or a questioner terminal.

In particular, in this method, answer areas about which answerers can answer are registered in the answerer database. Therefore, when a question is received, it is not necessary to access terminals of answerer candidates to select an answerer terminal. This makes it possible to increase the processing speed in selecting an answerer terminal compared with a method in which locations of answerer candidates are acquired based on GPS location information each time a question is received.

For example, in the method, (C) may include (c1) selecting, from the plurality of answer areas, one or more answer areas each overlapping at least partially the question area;

and (c2) determining, from the plurality of terminals, as the one or more answerer terminals, one or more terminals related to one or more answerer candidates able to answer about the selected one or more answer areas.

For example, in the method, (C) may include (c1) selecting, from the plurality of answer areas, one or more answer areas each overlapping at least partially the question area; and (c2) determining, from the plurality of terminals, as one or more answerer terminals, one or more terminals related to one or more answerer candidates able to answer about the selected one or more answer areas; and (c3) in a case where the number of the one or more candidate terminals is greater than or equal to a specified number, determining the one or more answerer terminals from the one or more candidate terminals such that one or more pieces of priority information respectively related to the one or more candidate terminals are acquired, and the number of the one or more candidate terminals is reduced based on the priority information. In this method, it is possible to narrow answers to the question by reducing the number of answerer terminals to which the question is sent, and thus it is possible to reduce a processing load on the computer (such as a server) and/or the questioner terminal.

For example, in a case where after (c2), the number of the one or more terminals is smaller than a specified number, one or more additional answer areas may be selected from answer areas located within a predetermined distance range from the question area, and one or more additional terminals respectively related to one or more additional answerer candidates able to answer about the selected one or more additional answer areas may be added to the one or more candidate terminals.

For example, in a case where after (E), the number of at least one piece of answer information is less than a specified number, the condition for reducing the number of the one or more candidate terminals may be eased and (c3) may be performed again under the eased condition thereby determining additional one or more answerer terminals, and the question information may be transmitted to the additional one or more answerer terminals. In this method, the number of answerer terminals is increased in a phased manner, and thus it is possible to prevent an abrupt increase in the number of answers, which allows a reduction in a peak processing load on a computer (such as a server) and/or a questioner terminal.

According to an aspect, the present disclosure provides an information providing method for providing an answer to a question about an area, including acquiring a plurality of pieces of answer area information indicating an answer area about which the question asks from a plurality of terminals satisfying a particular condition, acquiring question area information indicating a question area about which the question asks and question information indicating a content of the question from one terminal satisfying the particular condition, determining one or more transmission destination terminals to which the question information is to be transmitted from the plurality of terminals based on the plurality of pieces of answer area information and the question area information, transmitting the question information to the one or more transmission destination terminals, acquiring, from at least one transmission destination terminal of the one or more transmission destination terminals, one or more pieces of answer information each indicating a content of an answer to the question indicated by the question information, and transmitting the one or more pieces of answer information to the one terminal.

In this information providing method, in response to question area information and question information issued from one terminal, answer information indicating an answer to a content of the question indicating by the question information is acquired from a terminal from which answer area information matching the question area information is acquired, and the resultant answer information is transmitted to the one terminal described above.

Thus, using one terminal, a visitor to an area is allowed to acquire proper answer information to a question.

Thus, the information providing method described above enables it to provide information that better matches a question about which a visitor to an area wants to ask than is provided by a conventional technique.

According to an aspect, the present disclosure provides an information providing method executed by a terminal including a display, including acquiring question area information indicating a question area about which a question asks and question information indicating a content of a question, transmitting the question area information and the question information to a server, and acquiring, from the server, one or more pieces of answer information each indicating a content of an answer to a content of the question indicated by the question information where the one or more pieces of answer information are acquired by the server from one or more external terminals determined by the server based on the question area information.

In this information providing method, question area information and question information are acquired from a terminal used by a visitor to an area, and an external terminal is determined based on the question area information, and from this external terminal, answer information indicating an answer to a content of a question indicated by the question information is acquired and provided to the terminal of the visitor.

Thus, using the terminal, the visitor to the area is allowed to acquire answer information well matched to the question.

Thus, the information providing method described above enables it to provide information that better matches a question about which a visitor to an area wants to ask than is provided by a conventional technique.

According to an aspect, the present disclosure provides an information providing method executed by a terminal including a display, including acquiring answer area information associated with an answer area about which an answer is requested, transmitting the answer area information to a server, acquiring question information indicating a content of a question which is obtained by the server from an external terminal and transmitted from the server to the above-described terminal that is determined by the server, based on the answer area information, as a terminal to which the question information is to be transmitted, acquiring answer information indicating a content of an answer to the content of the question indicated by the question information, and transmitting the answer information to the server.

In this information providing method, a terminal used by a supporter located in an answer area and able to provide an answer about the answer area can acquire, from a server, question information based on answer area information provided by the supporter. The terminal can acquire, from the supporter, answer information indicating a content of an answer to a content of a question indicated by the question information, and the terminal can transmit the answer information to the server.

Thus, the terminal is capable of transmitting, to the server, answer information which is well matched to the content of the question and which is to be provided to a visitor to the area.

Thus, the information providing method described above enables it to provide information that better matches a question about which a visitor to an area wants to ask than is provided by a conventional technique.

Specific examples of information providing systems according to embodiments of the present disclosure are described below with reference to drawings. Note that each embodiment described below is merely for illustrating a specific example of the present disclosure. Therefore, in the following embodiments of the present disclosure, values, shapes, constituent elements, locations of elements, manners of connecting elements, steps, the order of steps, and the like are described by way of example but not limitation. Among constituent elements described in the following embodiments, those constituent elements that are not described in independent Claims of the present disclosure are optional. Note that each drawing is a schematic diagram, which does not necessarily provide a strict description.

EMBODIMENTS

Embodiments of the present disclosure are described below, by way of example, for a case in which an information providing system provides useful information to a visitor to a particular area. This information providing system accepts a question about an area from a visitor who visits this area, and provides, to the visitor, an answer to the question given by a supporter who supports the area.

Referring to drawings, the information providing system is described in detail below.

1. Configuration

FIG. 1 is a block diagram illustrating a configuration of an information providing system 100 according to an embodiment of the present disclosure.

As illustrated in FIG. 1, the information providing system 100 includes a server 1, and a plurality of terminals 2 (in the present example, a terminal 2a, a terminal 2b, a terminal 2c, and terminal 2d) which communicate with the server 1.

1-1. Terminal

Figure 2:
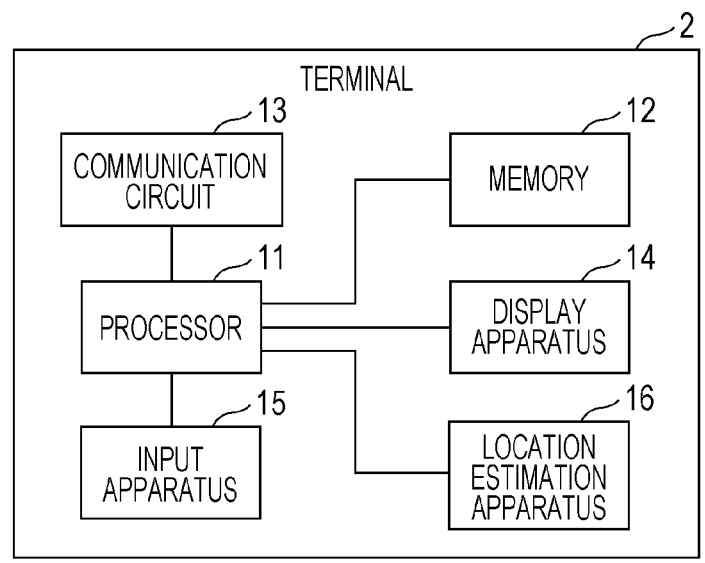
FIG. 2 is a block diagram illustrating a circuit configuration of a terminal according to an embodiment.

FIG. 2 is a block diagram illustrating a circuit configuration of a terminal 2.

As illustrated in FIG. 2, the terminal 2 includes a processor 11, a memory 12, a communication circuit 13, a display apparatus 14, an input apparatus 15, and a location estimation apparatus 16.

The processor 11 controls, by executing a program stored in the memory 12, operations of the memory 12, the communication circuit 13, the display apparatus 14, the input apparatus 15, and the location estimation apparatus 16.

The memory 12 stores the program executed by the processor 11. Note that part of a storage area of the memory 12 is used by the processor as a working area when the program is executed.

The communication circuit 13 includes, for example, a communication LSI and an antenna configured to communicate with the server 1.

The display apparatus 14 includes, for example, using a flat panel such as a liquid crystal display configured to display an image on a display plane.

The input apparatus 15 includes, for example, a transparent touch pad overlaid on the display plane of the display apparatus 14 configured to accept an operation by a user and generate an electric signal corresponding to the operation.

The location estimation apparatus 16 includes, for example, a GPS signal reception circuit that receives a GPS signal and a location estimation circuit that estimates, based on the received GPS signal, a location where the GPS signal is received, configured to estimate a location of the terminal 2 based on the GPS signal.

The terminal 2 realizes various functions by controlling operations of the memory 12, the communication circuit 13, the display apparatus 14, the input apparatus 15, and the location estimation apparatus 16 by executing a program stored in the memory 12 by the processor 11.

Figure 3:
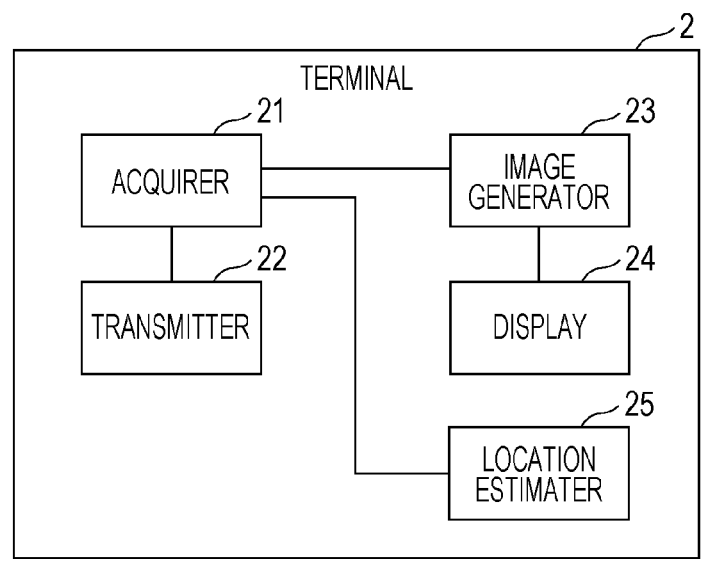
FIG. 3 is a block diagram illustrating a functional configuration of a terminal according to an embodiment.

FIG. 3 is a block diagram illustrating a functional configuration of the terminal 2.

As illustrated in FIG. 3, the terminal 2 includes an acquirer 21, a transmitter 22, an image generator 23, a display 24, and a location estimator 25.

The acquirer 21 is realized, for example, by controlling operations of the memory 12, the communication circuit 13, the display apparatus 14, the input apparatus 15, and the location estimation apparatus 16 by executing a program stored in the memory 12 by the processor 11.

The acquirer 21 acquires question area information indicating a question area which is an area about which a question asks and question information indicating a content of the question. More specifically, for example, the acquirer 21 may accept an input operation performed by a user using the terminal 2 to input information into the input apparatus 15 thereby acquiring question area information and question information from the user.

The question area information may be any kind of information as long as a location is identified by the information. For example, the question area information may be information indicating an administrative district such as a city, town, village, or the like or may be information indicating a landmark name such as a station, a facility, or the like.

For example, in a case where the question area information indicates a landmark name, the question area may be automatically set to a particular area that includes the landmark, or the question area may be set to a particular area that is set in advance by a user so as to include the landmark.

The question information may be information represented by a text string in a question format or may be information represented by a text string which is not in the question format. For example, the question information may be a text string "I want to go to a spiritual place".

Furthermore, the acquirer 21 acquires, from the server 1, one or more pieces of answer information each indicating a content of an answer to a content of the question indicated by the question information where the one or more pieces of answer information are acquired by the server 1 from one or more external terminals (terminals 2 other than the present terminal 2) identified by the server 1 based on the question area information.

For example, when the question information is a text string "I want to go to a spiritual place.", the answer information may be, for example, a text string "Namba Yasuka Shrine is popular".

Note that a method of determining the terminals 2, by the server 1, based on the question area information will be described later.

In the acquisition of the question area information described above, for example, when a map is displayed on the display 24, the user of the present terminal 2 of interest (the questioner terminal) may perform an operation to identify the question area, and the acquirer 21 may accept the operation performed by the user thereby acquiring the question area information.

Figure 4:
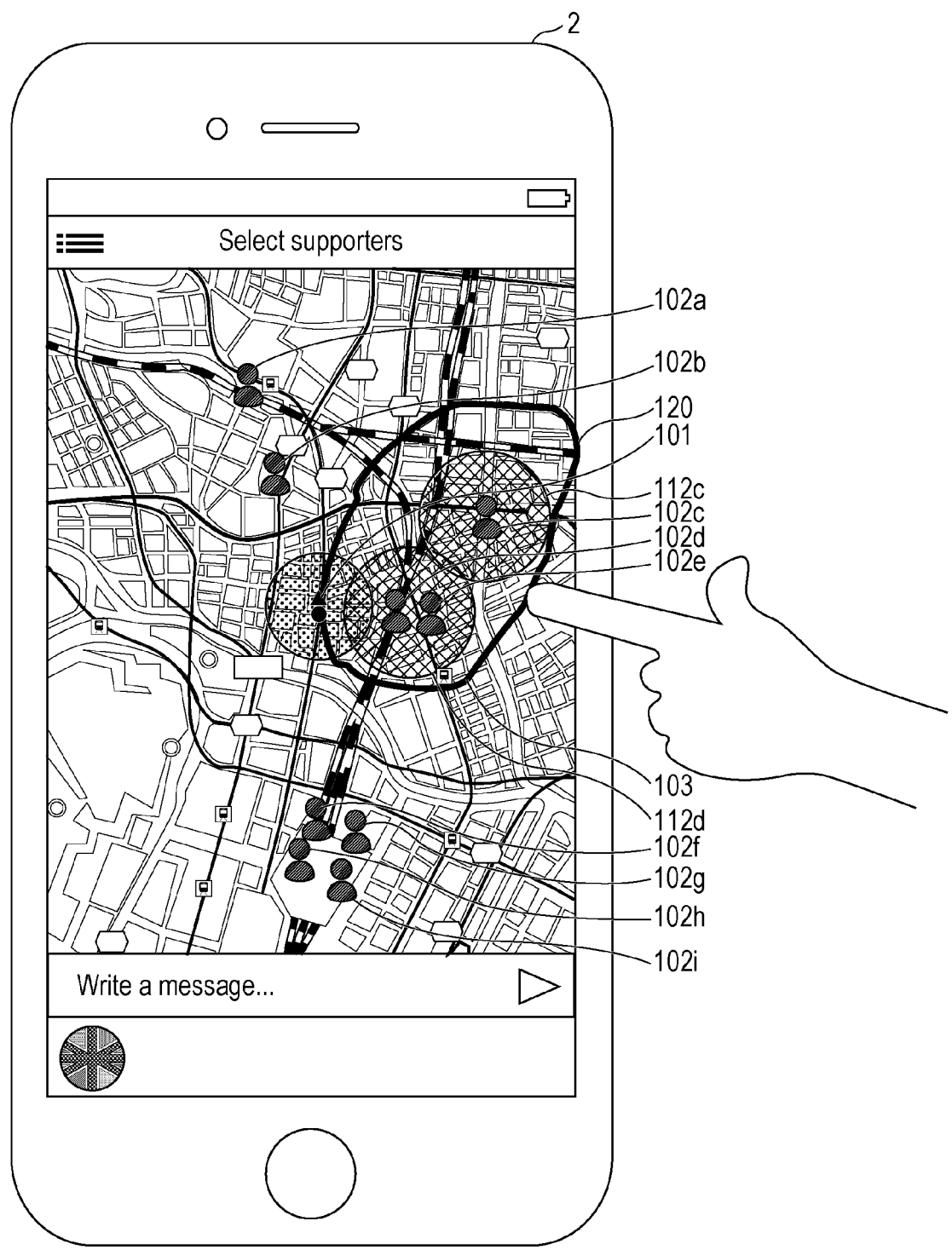
FIG. 4 is a schematic diagram illustrating an example of a manner in which an acquirer acquires question area information according to an embodiment.

FIG. 4 is a schematic diagram illustrating an example of a manner in which the acquirer 21 acquires question area information in a state in which a map is displayed on the display 24.

For example, the transparent touch pad forming the input apparatus 15 overlaid on the display plane of the liquid crystal display of the display apparatus 14 accepts a touch operation performed by the user.

As shown in FIG. 4, the display 24 may display answerer marks 102 (for example, answerer marks 102a to 102i in the present example) indicating the locations of other terminals 2 such that the answerer marks 102 are superimposed on the map, or the display 24 may display a questioner mark 101 indicating the location of the present terminal of interest. The location of each terminal 2 may be a location estimated by the location estimator 25 (described later) including in the terminal 2. The terminals 2 may correspond, in a one to one manner, to the answerer marks 102, or a plurality of terminals 2 may correspond to one answerer mark collectively indicating a plurality of terminals 2.

For example, the user of the terminal 2 may touch one or more answerer marks 102 (for example, the answerer mark 102c and the answerer mark 102e in the present example) in the answerer marks 102 superimposed on the map thereby specifying, as the question area, a particular area (for example, an area 112c and an area 112e in the present example) surrounding the touched answerer marks 102.

Alternatively, the user of the terminal 2 may perform a touch operation while moving his/her finger or the like such that a particular desired area is surrounded by a locus of movement of the finger or the like thereby specifying the question area by the surrounded area (for example, an area 120).

Alternatively, the user of the terminal 2 may input a text string indicating an address or the like visible on the map thereby specifying the question area by an area identified by the address or the like.

For example, the display 24 may display a map such that an area where a large number of other terminals 2 densely exist, an area where other terminals 2 sparsely exist, an area where no other terminals 2 exist, and the like can be visibly distinguished from each other as in a heat map.

For example, the acquirer 21 may acquire question area information by generating the question area information based on information indicating an estimated location of the terminal 2 output from the location estimator 25 (described later) that estimates the location of the terminal 2. In this acquisition process, for example, the acquirer 21 may generate the question area information by employing, as the question area, an area (for example, an area 103) defined within a particular range set in advance by the user from the location of the terminal 2 estimated by the location estimator 25.

The acquirer 21 also acquires answer area information indicating an answer area about which an answer is requested to be given. More specifically, for example, the acquirer 21 may acquire answer area information from a user of a terminal 2 by accepting an input operation performed, by this user, to input information into the input apparatus 15.

As with the question area information, the answer area information may be any kind of information as long as the information identifies a location.

The acquirer 21 also acquires question information such that the question information indicating a content of a question is acquired by the server 1 from an external terminal (a terminal 2 other than the present terminal of interest) and transmitted from the server 1 to the present terminal of interest determined by the server 1 as the transmission destination terminal based on the answer area information.

Note that the identifying of the terminal 2 performed by the server 1 based on the answer area information will be described later.

The acquirer 21 further acquires answer information indicating a content of an answer to the content of the question indicated by the question information. More specifically, for example, the acquirer 21 may acquire answer information from a user of a terminal 2 by accepting an input operation performed by this user to input information using the input apparatus 15.

Referring again to FIG. 3, the functional configuration of the terminal 2 is further described below.

The transmitter 22 is realized, for example, by controlling operations of the memory 12 and the communication circuit 13 by executing a program stored in the memory 12 by the processor 11.

The transmitter 22 transmits question area information and question information to the server 1.

The transmitter 22 also transmits answer area information to the server 1.

Furthermore, the transmitter 22 transmits answer information to the server 1.

For example, in a case where the acquirer 21 does not acquire answer information before a predetermined time elapses since the acquisition of the question information transmitted from the server 1, the transmitter 22 may not transmit the answer information to the server 1.

The image generator 23 is realized, for example, by controlling operations of the memory 12, the display apparatus 14, and the location estimation apparatus 16 by executing a program stored in the memory 12 by the processor 11.

The image generator 23 generates one or more images in a chat format based on the question information and at least one piece of answer information.

Figure 5A:
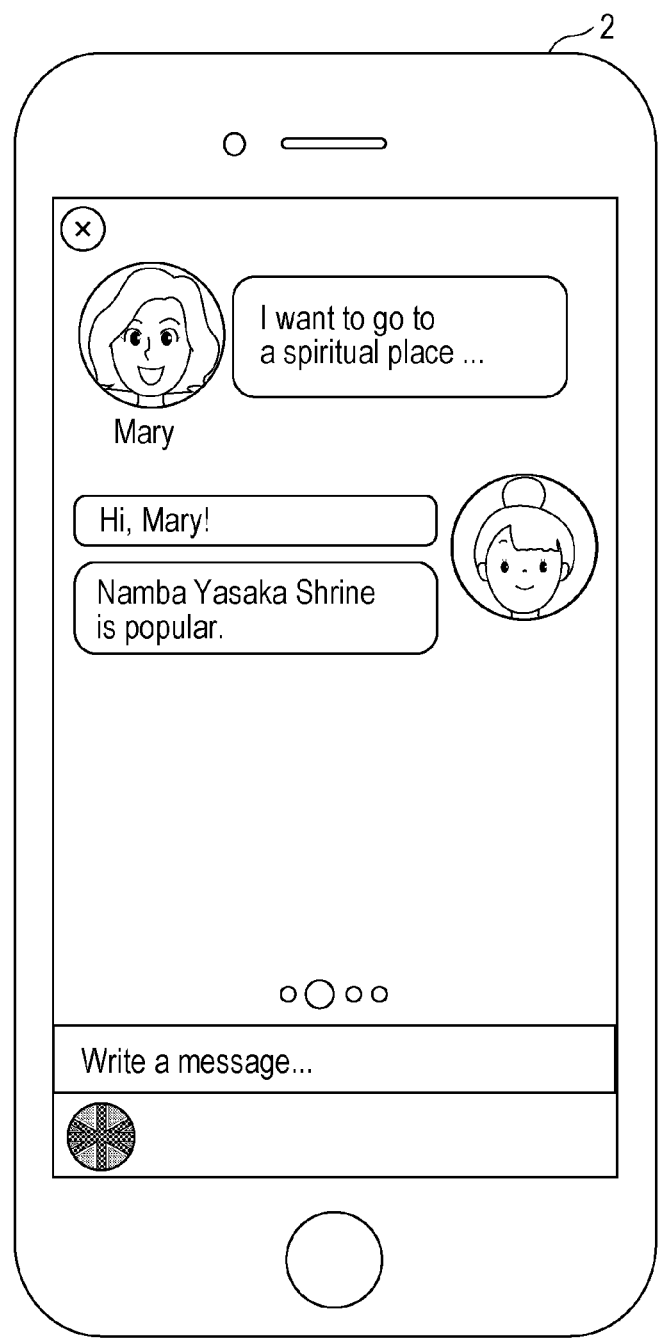
FIG. 5A is a schematic diagram illustrating an example of a chat-format image.
Figure 5B:
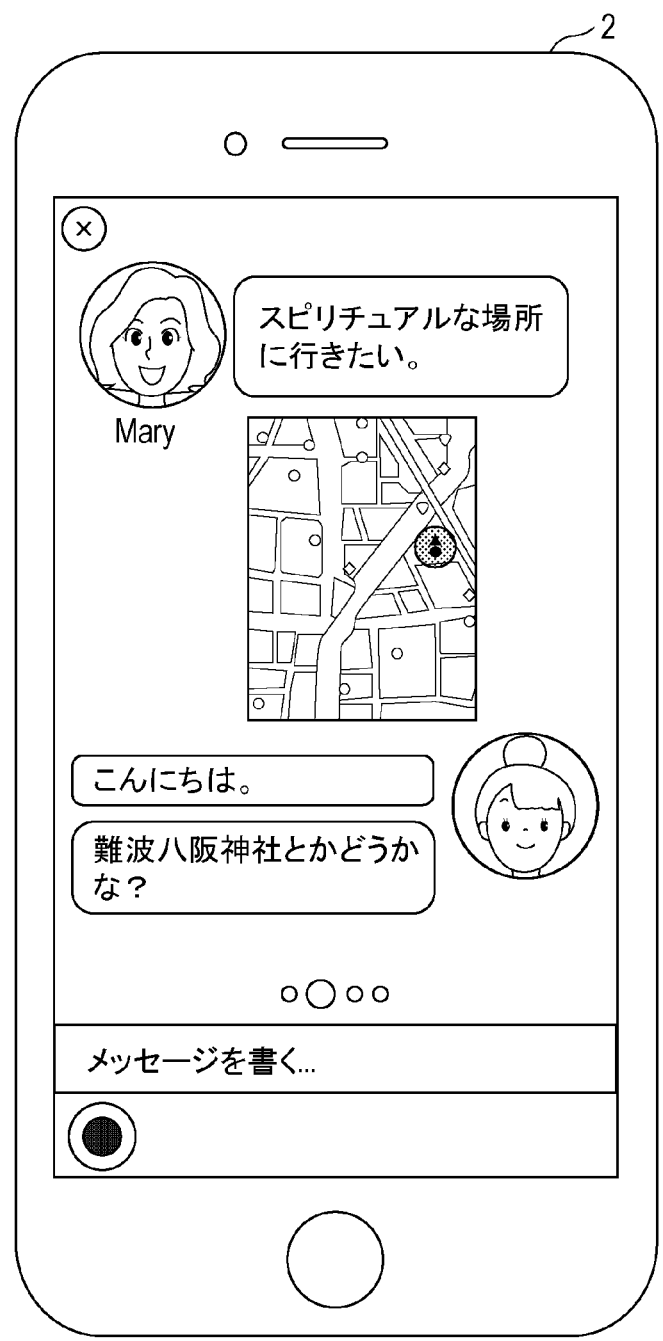
FIG. 5B is a schematic diagram illustrating an example of a chat-format image.

FIG. 5A and FIG. 5B are schematic diagrams each illustrating an example of an image in the chat format generated by the image generator.

FIG. 5A illustrates an example of an image in the chat format in which the question information includes information indicating an English text string "I want to go to a spiritual place", one piece of answer information includes information indicating an English text string "Hi, Mary!", and another piece of answer information includes information indicating an English text string "Namba Yasaka Shrine is popular". FIG. 5B illustrates an example of an image in a chat format in which question information includes information indicating a Japanese text string meaning, in English, "I want to go to a spiritual place", one piece of answer information includes information indicating a Japanese text string meaning, in English, "Hi, Mary!", and another piece of answer information includes information indicating Japanese text string meaning, in English, "Namba Yasaka Shrine is popular". In the example shown in FIG. 5B, the image in the chat format includes a map including a mark indicating a location of a terminal 2 (hereinafter also referred to as a "questioner terminal") from which question information input via an input operation by a user thereof is acquired.

Referring again to FIG. 3, the functional configuration of the terminal 2 is further described below.

For example, the image generator 23 may generate the image in the chat format based on a user attribute registered in advance.

For example, in a case where the user attribute registered in advance in a terminal indicates a first language (for example, Japanese), if answer information includes information indicating a second text string described in a second language (for example, French) different from the first language, then the image in the chat format may be generated such that the second text string described in the second language is translated into a first text string in the first language and the resultant first text string in the first language is displayed in the image in the chat format. For example, in a case where the first language and the second language are both different from English, then the image in the chat format may be generated such that the generated image includes a third text string in English translated from the second text string.

As shown in FIG. 5A and FIG. 5B, the image generator 23 generates each chat-format image such that questioner terminals are related in a one-to-one fashion to terminals 2 from which answer information, input by users of the terminals 2 is acquired (hereinafter, each such a terminal 2 will also be referred as an "answerer terminal").

In the case where the questioner terminals are related in a one-to-one manner to the answerer terminals, the chat-format image generated by the image generator 23 of the questioner terminal may be similar to or different from the image in the chat format generated by the image generator 23 of the answerer terminal.

For example, when the image generator 23 generates the chat-format image, the image generator 23 may limit the number of pieces of question information included in one chat-format image to a value that is automatically set or set by a user.

The display 24 is realized, for example, by controlling operations of the memory 12 and the display apparatus 14 by executing a program stored in the memory 12 by the processor 11.

The display 24 displays one or more chat-format images generated by the image generator 23.

Furthermore, when the terminal of interest is a questioner terminal, for example, in a case where the server 1 acquires first answer information from a first external terminal and the server 1 acquires second answer information from a second external terminal, the display 24 of the questioner terminal may selectively display, depending on an operation performed by a user, a first chat-format image generated based on the question information and first answer information or a second chat-format image generated based on the question information and second answer information.

When the terminal of interest is an answerer terminal, for example, in a case where the server 1 acquires first question information from a first external terminal and the server 1 acquires second question information from a second external terminal, if first answer information corresponding to the first question information and second answer information corresponding to the second question information are acquired from the server 1, the display 24 of the answerer terminal may selectively display, depending on an operation performed by a user, a first chat-format image generated based on the first question information and the first answer information or a second chat-format image generated based on the second question information and the second answer information.

Figure 6A:
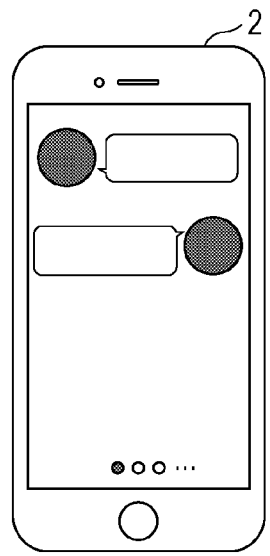
FIG. 6A is a schematic diagram illustrating a first chat-format image.
Figure 6B:
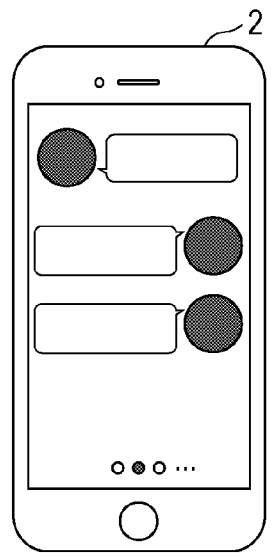
FIG. 6B is a schematic diagram illustrating a second chat-format image.
Figure 6C:
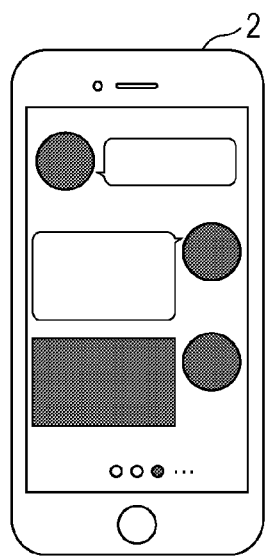
FIG. 6C is a schematic diagram illustrating a third chat-format image.

FIG. 6A is a schematic diagram illustrating a first image in a chat format generated such that the questioner terminal and the first answerer terminal are associated in a one-to-one manner to each other. FIG. 6B is a schematic diagram illustrating a second chat-format image generated such that the questioner terminal and the second answerer terminal are associated in a one-to-one manner to each other. FIG. 6C is a schematic diagram illustrating a third chat-format image generated such that the questioner terminal and the third answerer terminal are associated in a one-to-one manner to each other.

For example, the display 24 may display one chat-format image over the whole display plane of the display apparatus 14, or may divide the display plane into a plurality of sub-screens and may display a plurality of chat-format images such that one chat-format image is displayed in one sub-screen. However, in a case where the display plane of the display apparatus 14 is relatively small, from the point of view of visibility or operability, it is desirable to display one chat-format image on the whole display plane without dividing the display plane into a plurality of sub-screens.

For example, in a case where the number of chat-format images generated by the image generator 23 is set in a terminal 2 to 3, when the display 24 of this terminal 2 displays one chat-format image on the whole display plane, the display 24 may switch the displayed image among a first chat-format image, a second chat-format image, or third chat-format image selectively depending on an input operation such as swiping or the like performed by a user.

For example, in a case where there is another chat-format image capable of being displayed in addition to a chat-format image being currently displayed, the display 24 may display a mark (for example, "•••") superimposed on the chat-format image being currently displayed to indicate that there is another chat-format image capable of being displayed. In this case, the display 24 may change the chat-format image in response to a touch operation on a mark "•••" performed by a user, or may change the chat-format image according to a combination of a touch operation on the mark "•••" and a swipe operation performed by a user.

Referring again to FIG. 3, the functional configuration of the terminal 2 is further described.

The location estimator 25 is realized, for example, by controlling operations of the memory 12 and the location estimation apparatus 16 by executing a program stored in the memory 12 by the processor 11.

The location estimator 25 estimates the location of the present terminal of interest and outputs location information indicating the estimated location of the present terminal of interest.

Figure 7:
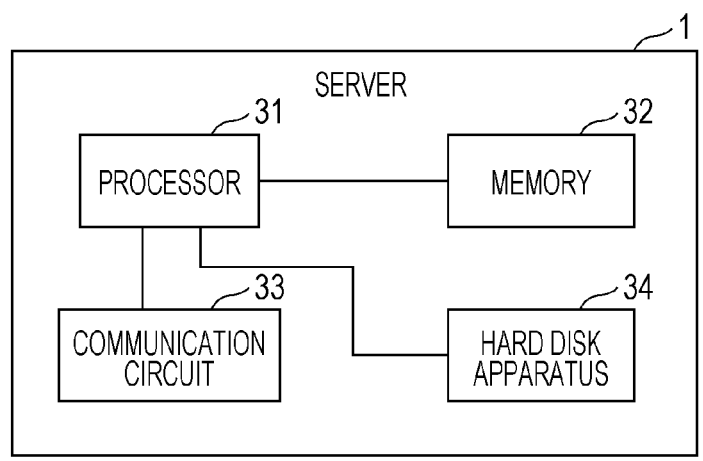
FIG. 7 is a block diagram illustrating a circuit configuration of a server according to an embodiment.

FIG. 7 is a block diagram illustrating a circuit configuration of the server 1.

As illustrated in FIG. 7, the server 1 includes a processor 31, a memory 32, a communication circuit 33, and a hard disk apparatus 34.

The processor 31 controls operations of the memory 32, the communication circuit 33, and the hard disk apparatus 34 by executing a program stored in the memory 12.

The memory 32 stores the program executed by the processor 31. Note that part of a storage area of the memory 32 is used by the processor as a working area when the program is executed.

The communication circuit 33 includes, for example, a communication LSI and an antenna and communicates with the respective terminals 2.

1-2. Server

Various functions of the server 1 are realized, for example, by controlling operations of the memory 32, the communication circuit 33, and the hard disk apparatus 34 by the processor 31 by executing a program stored in the memory 32.

Figure 8:
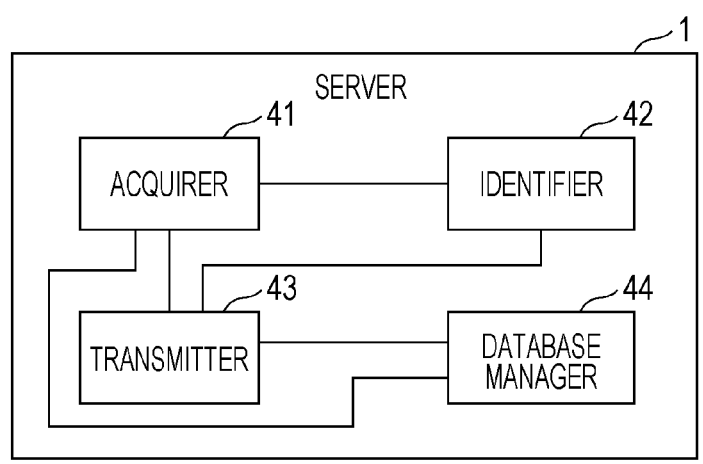
FIG. 8 is a block diagram illustrating a functional configuration of a server according to an embodiment.

FIG. 8 is a block diagram illustrating a functional configuration of the server 1.

As shown in FIG. 8, the server 1 includes an acquirer 41, an identifier 42, a transmitter 43, and a database manager 44.

The acquirer 41 is realized, for example, by controlling operations of the memory 32 and the communication circuit 33 by executing a program stored in the memory 32 by the processor 31.

The acquirer 41 acquires a plurality of pieces of answer area information respectively indicating answer areas about which a question asks, from a plurality of terminals 2 satisfying a particular condition.

For example, the acquirer 41 may store, in advance, a list of terminals 2 satisfying the particular condition (hereinafter, the list will also be referred to as the "registered terminal list"). For example, the particular condition may be a condition requiring that a user of the terminal 2 is well qualified for use of the information providing system 100. More specifically, for example, the particular condition may be a condition requiring that the user of the terminal 2 has an account of SNS and the number of friends the user has on the SNS is equal to or greater than a specified value (for example, five friends).

For example, the acquirer 41 may store a plurality of pieces of acquired answer area information in association with respective terminal identification IDs identifying the terminals 2 from which the answer area information is acquired. For example, the acquirer 41 may generate a list of pieces of answer area information each related to a terminal identification ID and may store the generated list (hereinafter, the list will also be referred to as the "answer area list").

The acquirer 41 acquires question area information indicating a question area about which a question asks and question information indicating a content of a question, from one terminal 2 satisfying the particular condition.

Furthermore, the acquirer 41 acquires one or more pieces of answer information each indicating a content of an answer to the content of the question indicated by the question information, from at least one of transmission destination terminals (described later) identified by the identifier 42.

The transmitter 43 is realized, for example, by controlling operations of the memory 32 and the communication circuit 33 by executing a program stored in the memory 32 by the processor 31.

The transmitter 43 transmits the question information to the one or more transmission destination terminals (described later).

The transmitter 43 also transmits the one or more pieces of answer information to the one terminal 2 described above.

In the transmission of answer information, for example, the transmitter 43 may limit the one or more pieces of answer information to those acquired within a period with a predetermined length (for example, 5 minutes) from a time at which question information is transmitted to the one or more transmission destination terminal by the transmitter 43, and the transmitter 43 may transmit the acquired one or more pieces of answer information.

For example, the identifier 42 is realized by controlling operations of the memory 32 by executing a program stored in the memory 32 by the processor 31.

The identifier 42 determines one or more transmission destination terminals to which question information is to be transmitted, from a plurality of terminals 2 satisfying the particular condition based on a plurality of pieces of answer area information and question area information.

More specifically, for example, the identifier 42 may determine the one or more transmission destination terminals such that an answer area, which matches a question area indicated by question area information acquired by the acquirer 41, is detected from a plurality of answer areas indicated by a respective plurality of pieces of area information acquired by the acquirer 41, and the one or more transmission destination terminals are determined from terminals 2 that provided the answer area information indicating the answer area.

For example, when question information is acquired by the acquirer 41, then, based on the answer area list stored in the acquirer 41, the identifier 42 may select a terminal 2 that provided answer area information indicating an answer area that matches a question area identified by question area information, and the identifier 42 may determine the selected terminal 2 as the transmission destination terminal.

For example, in a case where degrees of priority in the determining the transmission destination terminals are defined respectively for at least part of the terminals 2 that satisfy the particular condition described above, the identifier 42 may determine the one or more transmission destination terminals based on priority information indicating the degrees of priority.

The degree of priority for a particular transmission destination terminal may be determined, for example, based on a time (for example, a minimum time, an average time, etc.) taken to first acquire answer information indicating a content of an answer to a content of a question indicated by question information after the question information was transmitted to the transmission destination terminal by the transmitter 43. Alternatively, for example, the degree of priority for a particular terminal 2 may be determined based on the degree of matching between a user attribute registered in advance in the particular terminal 2 from which question information is acquired and a user attribute registered in advance in a terminal from which question information is acquired. Alternatively, for example, the degree of priority may be determined based on desired answer mode registered in advance in a terminal from which question information is acquired. The desired answer mode may be, for example, a mode in which "a thoughtful answer including a detailed description using an image is desired", or a mode in which "it is desired to quickly receive an answer". The degree of priority for a particular terminal 2 from which answer information is acquired may be determined based on an evaluation score for a user of the terminal 2 (for example, the number of comments "good" or the like given to the user). The degree of priority may be determined based on whether an answer includes a content inconvenient to a user of a terminal 2 from which question information is acquired.

For example, the identifier 42 may determine the one or more transmission destination terminals such that the number of determined transmission destination terminals is not greater than a predetermined first number of terminals (for example, five). Note that the first number of terminals may be different for each terminal 2 or may be equal for all terminals 2.

For example, the identifier 42 may determine the one or more transmission destination terminals such that the number of determined transmission destination terminals is not smaller than a predetermined second number of terminals (for example, 3). Note that the second number of terminals may be different for each terminal 2 or may be equal for all terminals 2.

For example, the database manager 44 is realized by controlling operations of the memory 32 and the hard disk apparatus 34 by executing a program stored in the memory 32 by the processor 31.

For example, the identifier 42 may perform the determination such that in a case where the number of the one or more pieces of answer information acquired by the acquirer 41 is smaller than a predetermined value (for example, 3), the identifier 42 determines one or more additional transmission destination terminals to which question information is to be transmitted based on a plurality of pieces of answer area information and question area information. In this case, for example, the transmitter 43 may transmit the question information to the one or more additional transmission destination terminals.

The database manager 44 generates or updates the answer database based on answer information. The database manager 44 permits the terminals 2 satisfying the particular condition to access the answer database.

The answer database may be built, for example, such that each piece of data stored in the answer database may be answer information in its original form or may be data generated based on answer information. The data generated based on the answer information may be configured such that a keyword of a question and a keyword of an answer are related to each in each piece of data.

Figure 9A:
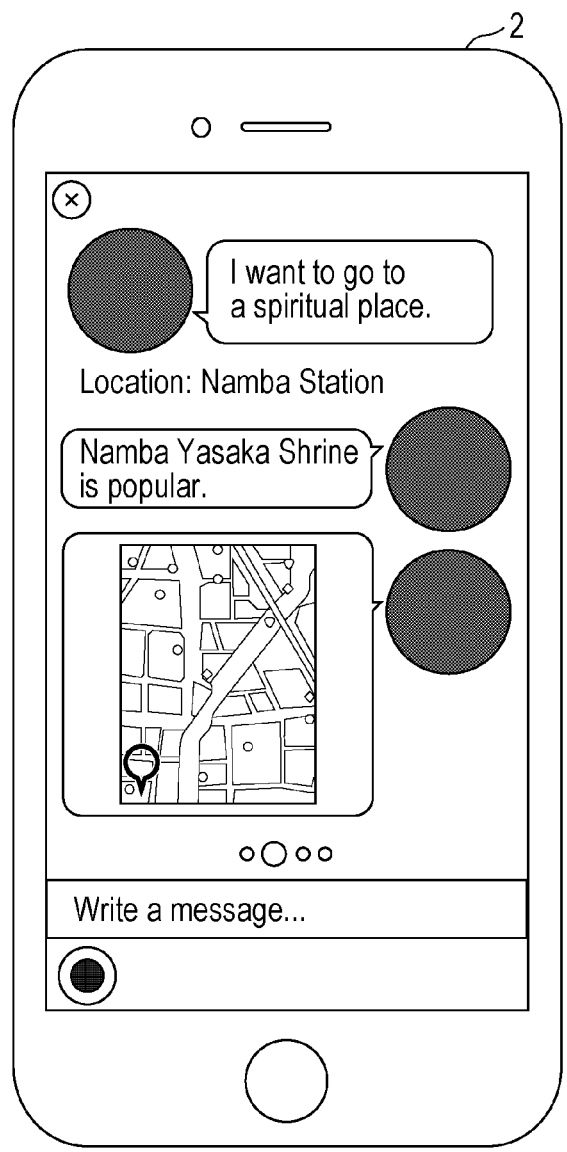
FIG. 9A is a schematic diagram illustrating an example of a chat-format image.
Figure 9B:
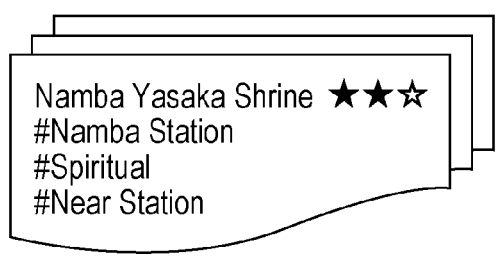
FIG. 9B is a schematic diagram illustrating an answer database.

FIG. 9A is a schematic diagram illustrating an example of a chat-format image generated based on a certain piece of answer information, and FIG. 9B is a schematic diagram illustrating an example of an answer database including, as one of elements, data generated based on the answer information.

Furthermore, for example, the database manager 44 may generate chatbot answer information indicating a content of an answer to a question indicated by question information based on the answer database. In this case, the transmitter 22 may transmit the generated chatbot answer information, for example, to the one terminal 2.

Figure 10:
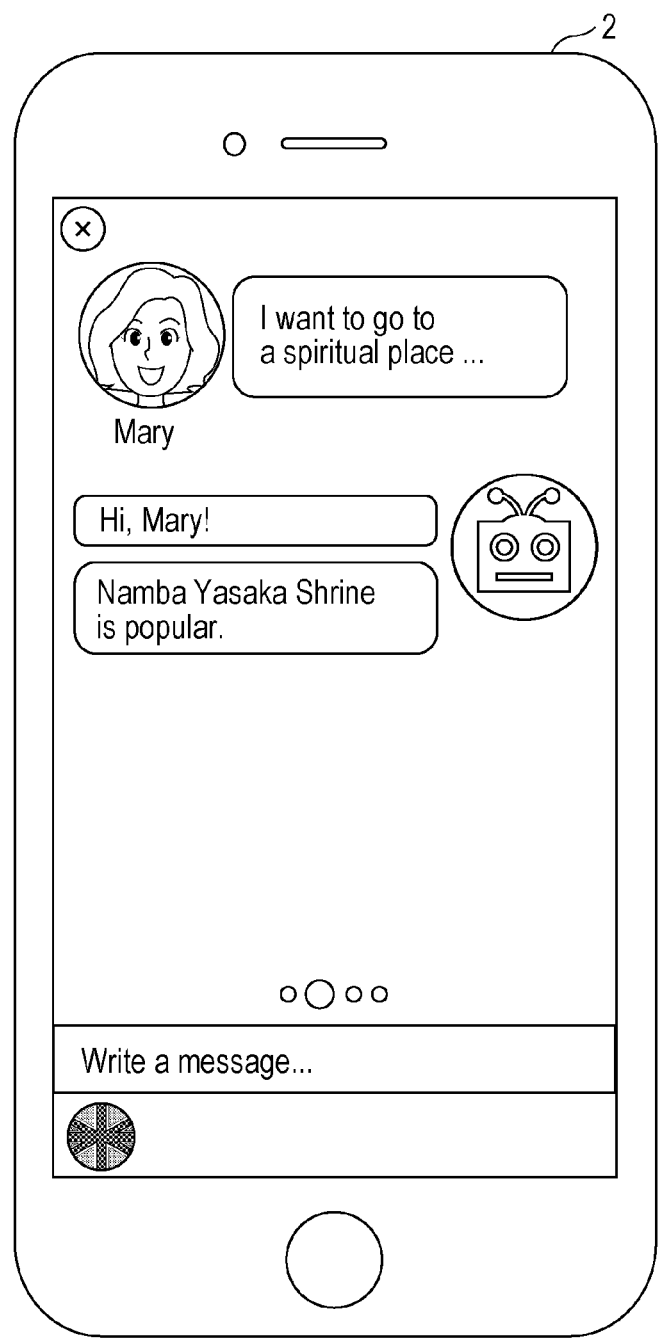
FIG. 10 is a schematic diagram illustrating an example of a chat-format image.

FIG. 10 is a schematic diagram illustrating an example of a chat-format image generated by the image generator 23 of the terminal 2 that acquires chatbot answer information transmitted from the server 1.

An operation performed by the information providing system 100 configured in the above-described manner is described below with reference to drawings.

2. Operation

The operation performed by the information providing system 100 is characterized by including a terminal registration process, a process of starting chat at questioner side, a transmission destination terminal determination process, and a process of starting chat at answer side. These processes, that is, the terminal registration process, the process of starting chat at questioner side, the transmission destination terminal determination process, and the process of starting chat at answer side are described below one by one.

2-1. Terminal Registration Process

The terminal registration process is a process performed by an unregistered terminal, which is one of a plurality of terminals 2 and which is not yet registered in the server 1, in order to register the terminal in the server 1. Hereinafter, a process performed by the server 1 to add a terminal identification ID identifying an unregistered terminal to be registered to a registered terminal list is referred, by way of example, as registering of an unregistered terminal in the server 1.

Figure 11:
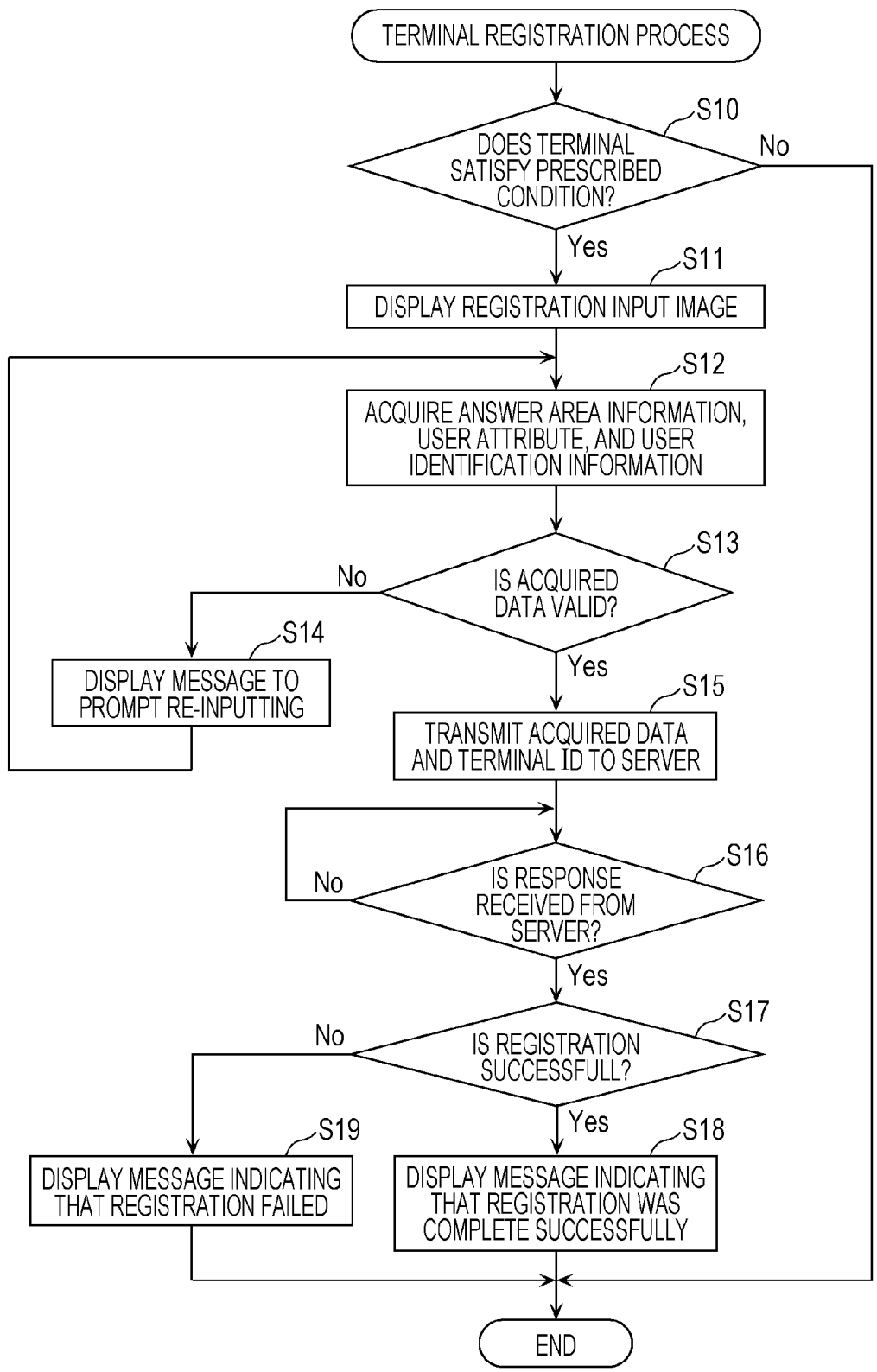
FIG. 11 is a flow chart illustrating a terminal registration process.

FIG. 11 is a flow chart illustrating a terminal registration process.

The terminal registration process is started when an acquirer 21 of a terminal 2 which is not yet registered in the server 1 accepts an operation performed by a user of the terminal 2 to issue an instruction to start the terminal registration process.

When the terminal registration process is started, the acquirer 21 checks whether the present terminal of interest is a terminal satisfying the particular condition (step S10). More specifically, the acquirer 21 checks whether the user of present terminal of interest has an account of SNS and the number of friends the user has on the SNS is greater than or equal to a specified value (for example, five friends).

In a case where it is determined in step S10 that the terminal of interest is a terminal that satisfies a particular condition (Yes in step S10), the display 24 displays an image for inputting registration information (step S11).

Figure 12:
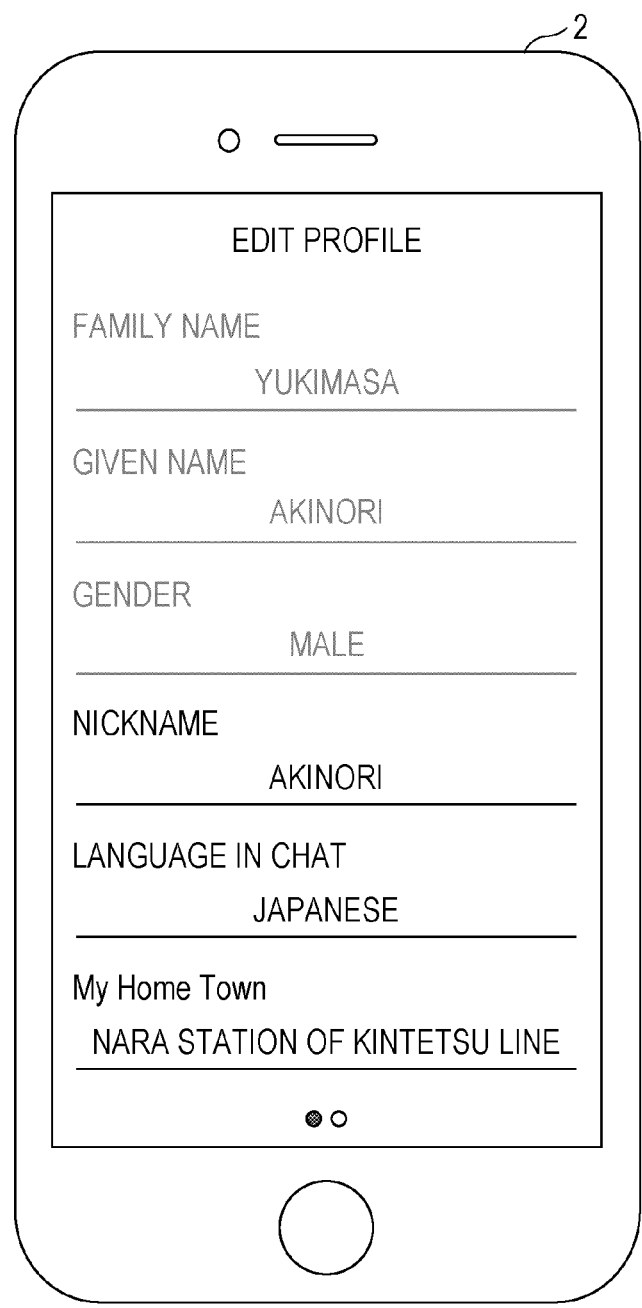
FIG. 12 is a schematic diagram illustrating an example of a screen for inputting data for registration.

FIG. 12 is a schematic diagram illustrating an example of an image for inputting registration information.

As illustrated in FIG. 12, the image for inputting registration information is an image that prompts a user of the terminal 2 to input "My Hometown" which is answer area information identifying an answer area, "Chat language" which is a user attribute of the user of the terminal 2, and "Nickname" which is user identification information identifying the user of the terminal 2.

The display 24 may further display a map to prompt the user to input answer area information. More specifically, for example, the acquirer 21 may determine, as "My Hometown", an area specified by a touch operation or the like on the map.

Referring again to FIG. 11, the terminal registration process is further described below.

When the image for inputting registration information is displayed, the acquirer 21 acquires answer area information, user attribute, and user identification information input on the displayed image for inputting registration information by the user of the terminal 2 (step S12).

When the acquirer 21 acquires the answer area information, the user attribute, and the user identification information, the acquirer 21 checks whether these acquired pieces of data are valid according to predetermined formats (step S13).

In a case where it is determined in step S13 that the acquired data is not valid (No in step S13), the display 24 displays an image to prompt the user to re-input the data (step S14). Thus, the terminal 2 again performs the process in step S12.

For example, in a case where the terminal 2 includes a speaker, when the display 24 display the image to request re-inputting, the display 24 may also issue an alert sound from the speaker.

In a case where it is determined in step S13 that the acquired data is valid (Yes in step S13), the transmitter 22 transmits the acquired data and the terminal identification ID identifying the present terminal of interest to the server 1 (step S15).

After the acquired data and the terminal identification ID are transmitted to the server 1, the acquirer 21 waits until a response signal is received from the server 1 (step S16 is performed repeatedly as long as the result in step S16 is No).

While the acquirer 21 is in the waiting state described above, in the server 1, the acquirer 41 obtains the acquired data and the terminal identification ID transmitted from the transmitter 22, and adds answer area information included in the acquired data and the acquired terminal identification ID to the answer area list such that the answer area information and the terminal identification ID are related to each other, and registers the acquired terminal identification ID in the registered terminal list. In a case where the adding to the answer area list and the adding to the registered terminal list are successful, the transmitter 43 returns a response signal to the terminal 2 from which the acquired data and the terminal identification ID were received to notify that the registration is completed successfully. However, in a case where at least one of the adding to the answer area list and the adding to the registered terminal list is not successful, the transmitter 43 returns a response signal to the terminal 2 from which the acquired data and the terminal identification ID were received to notify that the registration failed.

When the response signal is returned from the server 1 in step S16 (Yes in step S16), the acquirer 21 acquires the response signal and checks whether the acquired response signal indicates that the registration was successful (step S17).

In a case where it is determined in step S17 that the acquired response signal indicates that the registration was successful (Yes in step S17), the display 24 displays information indicating that the registration was successful (step S18).

In a case where it is determined in step S17 that the acquired response signal indicates that the registration failed (No in step S17), the display 24 displays information indicating that the registration failed (step S19).

In a case where it is determined in step S10 that the present terminal of interest is not a terminal satisfying the particular condition (No in step S10), then, after a process in step S18 is ended or a process in step S19 is ended, the terminal 2 ends the terminal registration process.

2-2. Process of Starting Chat at Questioner Side

The process of starting a chat at a questioner side is a process performed by one of terminals 2 that are already been registered in the server 1 in order to acquire, as a questioner terminal, question information from a user. More specifically, this process is a process to start a chat conversation with an answerer terminal to acquire, from a user, answer information indicating a content of an answer to a content of a question indicated by question information.

Figure 13:
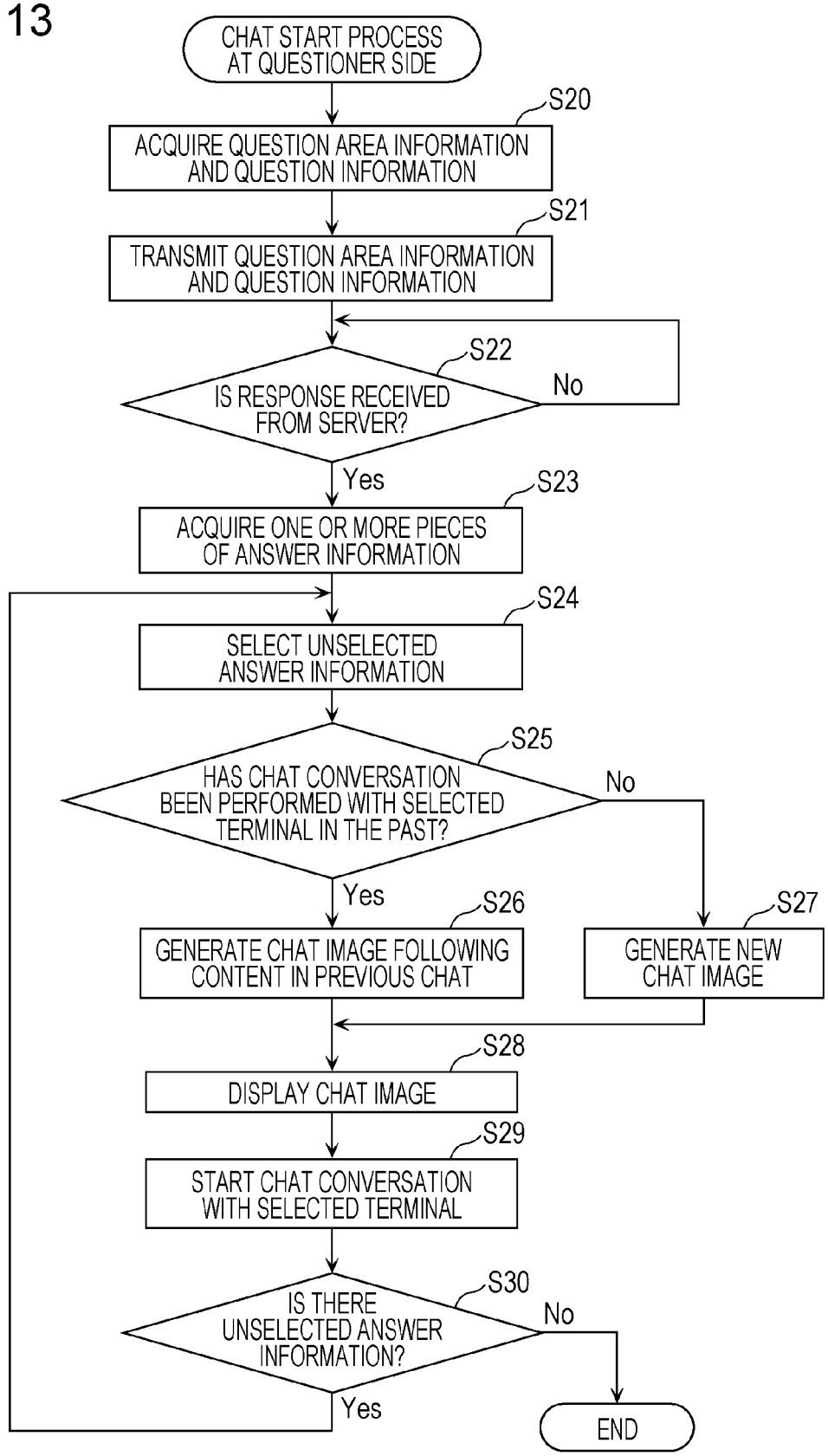
FIG. 13 is a flow chart illustrating a process of starting chat at questioner side.

FIG. 13 is a flow chart illustrating an example of a process of starting a chat at a questioner side.

The process of starting the chat at the questioner side is started when the acquirer 21 of a terminal 2 registered in the server 1 accepts an operation performed by a user of the terminal 2 to issue an instruction to start the process of starting the chat at the questioner side.

When the process of starting the chat at the questioner side is started, the acquirer 21 accepts an input operation by the user of the terminal 2 to acquire question area information identifying a question area and question information indicating a content of a question (step S20).

The transmitter 22 transmits the acquired question area information and question information, together with a terminal identification ID identifying the present terminal of interest to the server 1 (step S21).

After transmitting the question area information and the question information to the server 1, the acquirer 21 waits until one or more pieces of answer information are received (step S22 is performed repeatedly as long as the result in step S22 is No).

Each of the one or more pieces of answer information received from the server 1 includes a terminal identification ID identifying an answerer terminal from which answer information is acquired from a user.

In a case where one or more pieces of answer information is transmitted in step S22 from the server 1 (Yes in step S22), the acquirer 21 acquires the transmitted one or more pieces of answer information and terminal identification IDs corresponding to the respective one or more pieces of answer information (step S23).

The image generator 23 selects unselected one piece of answer information from the one or more pieces of answer information acquired by the acquirer 21 (step S24). The image generator 23 checks the terminal identification ID related to the selected answer information to determine whether a chat conversation has been performed in the past between the present terminal of interest and an answerer terminal (hereinafter also referred to as the "selected terminal") from which the present answer information is acquired from the user (step S25).

In a case where it is determined in step S25 that a chat conversation has been performed in the past (Yes in step S25), the image generator 23 generates a chat-format image so as to follow a content of the chat conversation performed previously (step S26).

In a case where it is determined in step S25 that no chat conversation has been performed in the past (No in step S25), the image generator 23 generates a new chat-format image (step S27).

In a case where step S26 or step S27 is ended, the image generator 23 displays the generated chat-format image (step S28). Thereafter, a chat conversation is started between the present terminal of interest and the selected terminal starting with the image displayed on the display 24 of the present terminal of interest (step S29).

When the chat conversation is started between the present terminal of interest and the selected terminal, the image generator 23 checks whether there is an unselected piece of answer information in the acquired on or more pieces of answer information (step S30).

In a case where it is determined in step S30 that there is unselected answer information (Yes in step S30), the terminal 2 again performs the process in step S24.

In a case where it is determined in step S30 that there is no unselected answer information (No in step S30), the terminal 2 ends the process of starting chat at questioner side.

2-3. Transmission Destination Terminal Determination Process

The transmission destination terminal determination process is a process performed by the server 1. In this transmission destination terminal determination process, when a questioner terminal acquires question information from a user, a determination is made as to a transmission destination terminal to which the question information is to be transmitted, and answer information is acquired from the determined transmission destination terminal and the acquired answer information is transmitted to the questioner terminal.

Figure 14:
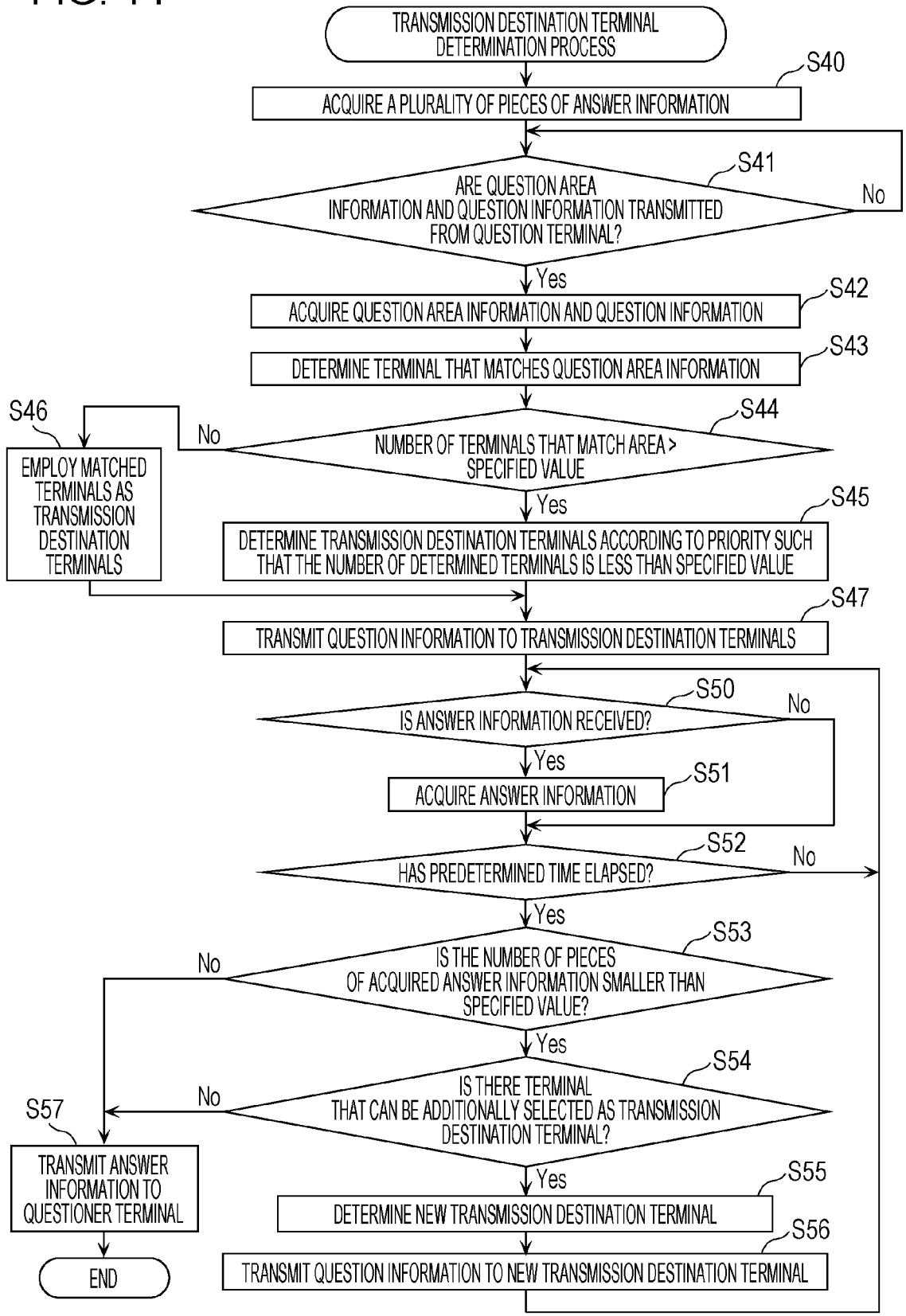
FIG. 14 is a flow chart illustrating a transmission destination terminal determination process.

FIG. 14 is a flow chart illustrating an example of a transmission destination terminal determination process.

The transmission destination terminal determination process is started when the server 1 is activated.

When the transmission destination terminal determination process is started, the acquirer 41 checks the registered terminal list, communicates with a plurality of registered terminals registered in the server 1, and acquires a plurality of pieces of answer area information from the respective plurality of registered terminals (step S40).

When the server 1 acquires the plurality of pieces of answer area information from the respective plurality of registered terminals, the server 1 also acquires terminal identification IDs identifying the respective plurality of registered terminals.

In a case where there is a registered terminal to which the server 1 is not capable of communicating, the acquirer 41 may acquire, from an answer area list, answer area information associated with the registered terminal to which communication cannot be performed.

When the plurality of pieces of answer area information associated with the plurality of registered terminals registered in the server 1 are acquired, the acquirer 41 waits until question area information and question information are received from one terminal 2 (a questioner terminal) registered in the server 1 (step S41 is performed repeatedly as long as the result in step S41 is No).

When question area information and question information are transmitted in step S41 from one terminal 2 (a questioner terminal) (Yes in step S41), the acquirer 41 acquires the question area information and the question information (step S42).

In this process, the one terminal 2 (the questioner terminal) also transmits a terminal identification ID identifying the one terminal 2 as well as the question area information and the question information. Thus, the acquirer 41 also acquires the terminal identification ID as well as the question area information and the question information.

When the question area information and the question information are acquired, the identifier 42 identifies a question area from the question information, and identifies, as an area-matched terminal, a terminal 2 that is related, in the stored answer area list, to an answer area corresponding to the identified question area (step S43).

The identifier 42 then checks whether the number of detected terminals related to the same area is larger than a predetermined number of terminals (for example, 5 terminals) (step S44).

In a case where it is determined in step S44 that the number of detected terminals related to the same area is larger than the predetermined number of terminals (Yes in step S44), the identifier 42 selects terminals based on the priority information indicating degrees of priority such that the number of selected terminals is equal to or smaller than the predetermined number of terminals, and the identifier 42 determines the selected terminals as the transmission destination terminals (step S45).

In a case where it is determined in step S44 that the number of detected terminals related to the same area is not larger than the predetermined number of terminals (No in step S44), the identifier 42 determines the respective area-matched terminals as the transmission destination terminals (step S46).

After the process in step S45 is ended or the process in step S46 is ended, the transmitter 43 transmitting the question information to the determined transmission destination terminals together with the identification ID of the questioner terminal (step S47).

After the question information is transmitted, the acquirer 41 acquires answer information in step S51 during a period until a predetermined time elapses (the process from step S50 to step S52 is performed repeatedly as long as No in step S52).

When it is determined in step S52 that the predetermined time has elapsed (Yes in step S52), the acquirer 41 checks whether the number of pieces of acquired answer information is smaller than a predetermined value (for example, 3) (step S53).

In a case where it is determined in step S53 that the number of pieces of acquired answer information is smaller than the predetermined value (Yes in step S53), the identifier 42 checks whether there is a terminal that can be employed as an additional transmission destination terminal (step S54). More specifically, in a case where the terminals detected as area-matched terminals includes a terminal that is not selected as a transmission destination terminal, the identifier 42 determines that there is a terminal that can be employed as an additional transmission destination terminal. However, in a case where the terminals detected as area-matched terminals do not include a terminal that is unselected as a transmission destination terminal, the identifier 42 determines that there is no terminal that can be employed as an additional transmission destination terminal.

In a case where it is determined in step S54 that there are one or more terminals that can be additionally employed as transmission destination terminals. (Yes in step S54), the identifier 42 determines, as new transmission destination terminals, at least part of the terminals additionally employable as transmission destination terminals (step S55). The transmitter 43 transmits the question information and the identification ID of the questioner terminal to the new transmission destination terminals (step S56).

When the process in step S56 is ended, the server 1 again performs the process in step S50.

In a case where it is determined in step S53 that the number of pieces of acquired answer information is not smaller than the predetermined value (No in step S53) or in a case where it is determined in step S54 that there is no terminal that can be employed as an additional transmission destination terminal (No in step S54), the transmitter 43 transmits the answer information to the one terminal 2 (the questioner terminal) (step S57).

In this process, the transmitter 43 transmits, together with the answer information, a terminal identification ID identifying each answerer terminal from which the answer information is acquired from a user.

When the process in step S57 is ended, the server 1 ends the transmission destination terminal determination process.

2-4. Process of Starting Chat at Answer Side

The process of starting a chat at an answer side is a process performed by a terminal 2 to which question information is transmitted from the server 1. More specifically, the process of starting a chat at an answer side is a process to start a chat conversation with a questioner terminal of a user from which the question information is acquired.

Figure 15:
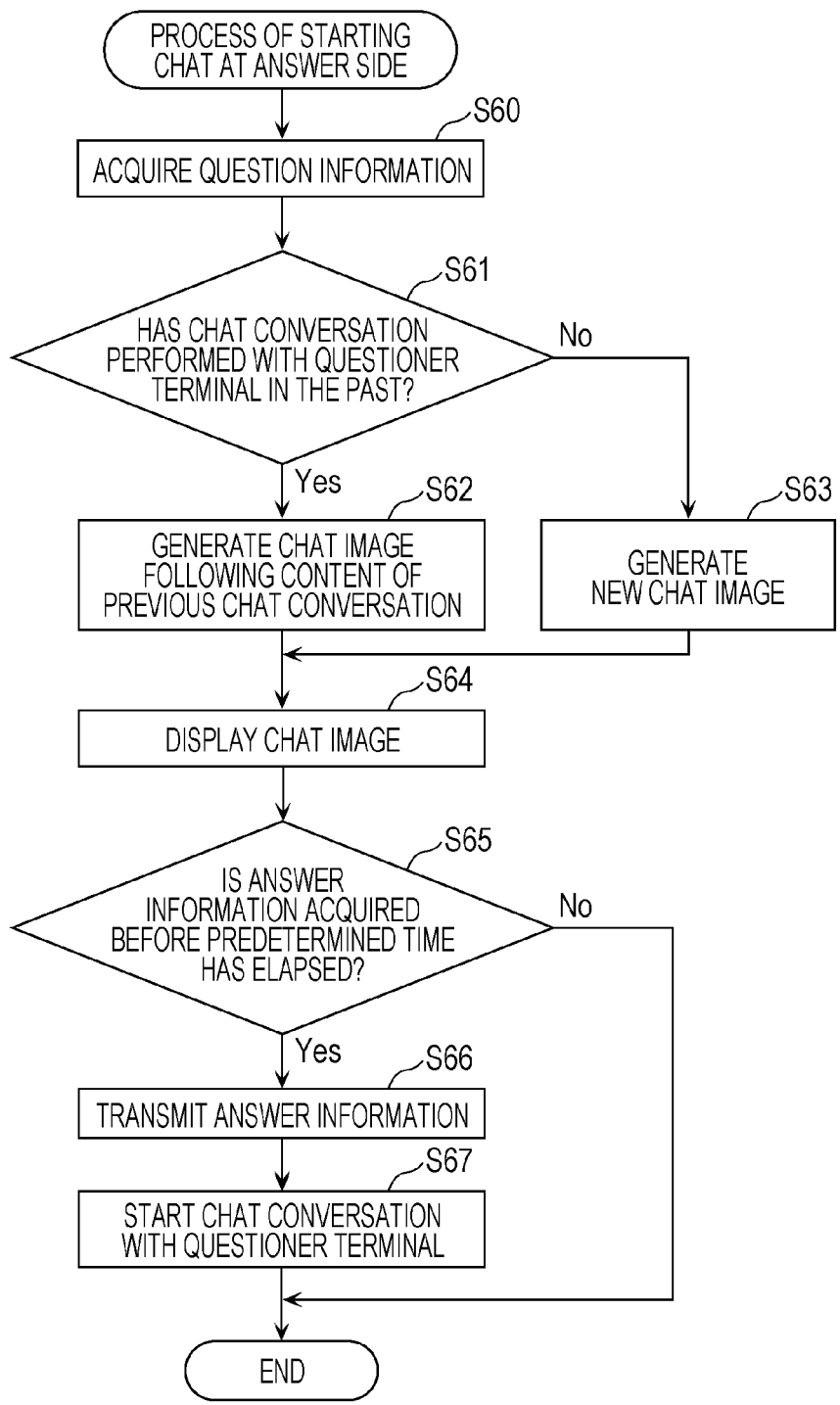
FIG. 15 is a flow chart illustrating a process of starting chat at answer side.

FIG. 15 is a flow chart illustrating an example of a process of starting chat at answer side.

The process of starting the chat at the answer side is started in response to transmitting question information to a terminal 2 from the server 1.

When the process of starting the chat at the answer side is started, the acquirer 21 acquires the question information transmitted from the server 1 (step S60).

In this process, the server 1 transmits, together with the question information, the terminal identification ID identifying the questioner terminal from which the question information issued by the user is acquired, and the acquirer 21 acquires the terminal identification ID together with the question information.

When the acquirer 21 acquires the question information, then, based on the terminal identification ID identifying the questioner terminal, it is checked whether a chat conversation has been performed in the past between the present terminal of interest and the questioner terminal (step S61).

In a case where it is determined in step S61 that a chat conversation has been performed in the past (Yes in step S61), the image generator 23 generates a chat-format image so as to follow a content of the chat conversation performed previously (step S62).

In a case where it is determined in step S61 that no chat conversation has been performed in the past (No in step S61), the image generator 23 generates a new chat-format image (step S63).

When the process in step S62 is ended or when the process in step S63 is ended, the image generator 23 displays the generated chat-format image (step S64).

After the chat-format image is displayed, the acquirer 21 accepts an input operation by a user on the input apparatus 15 during a period until a predetermined time (for example, 5 minutes) elapses since the question information is acquired in step S60 and the acquirer 21 checks whether answer area information is acquired from this user (step S65).

In a case where it is determined in step S65 that answer area information is acquired from the user before the predetermined period elapses (Yes in step S65), the transmitter 22 transmits the answer area information to the server 1 together with the terminal identification ID identifying the present terminal of interest (step S66). Thereafter, the image generator 23 displays the image on the display 24 of the present terminal of interest and starts the chat conversation between the present terminal of interest and the questioner terminal (step S67).

When the process in step S67 is ended, the terminal 2 ends the process of starting chat at answer side.

In a case where it is determined in step S65 that answer area information is not acquired before the predetermined time elapses (No in step S65), the terminal 2 ends the process of starting chat at answer side.

3. Effects

In the information providing system 100 configured in the above-described manner, when a visitor to an area inputs, in one terminal 2, information indicating the area and a question about the area, the visitor can acquire an answer to the question from a supporter who is registered as a supporter for this area. By further performing a chat conversation with the supporter, the visitor can further acquire a useful answer.

As described above, the information providing system 100 configured in the above-described manner can provide information to a visitor to a particular area about which the visitor wants to ask such that the provided information matches better what the visitor wants to know than is provided in the conventional technique.

Supplement

The techniques disclosed in the present disclosure have been described above with reference to embodiments to illustrate specific examples. However, the present disclosure is not limited to those embodiments described above, but modifications, replacements, additions, removals, and the like are possible.

Some examples of such modifications are described below.

(1) In the embodiments described above, it is assumed by way of example that each terminal 2 is realized by hardware in the form of a smartphone or the like as illustrated, for example, in FIG. 2 or elsewhere. However, the hardware structure of the terminal 2 is not limited to that of the smartphone as long as similar functions to those shown in FIG. 3 can be achieved. For example, the terminal 2 may be realized by hardware in the form of a laptop computer, a desktop computer, or the like.

(2) In the embodiments described above, it is assumed by way of example that the input apparatus 15 includes a transparent touch pad. However, the input apparatus 15 does not necessarily need to include a transparent touch panel as long as the input apparatus 15 has a function of accepting an operation performed by a user and generating an electric signal corresponding to the operation. For example, the input apparatus 15 may be realized by an apparatus including a keyboard, a mouse, or the like.

(3) In the embodiments described above, it is assumed by way of example that the location estimation apparatus 16 includes the GPS signal reception circuit that receives a GPS signal and the location estimation circuit that estimates, based on the received GPS signal, the location where the GPS signal is received. However, the location estimation apparatus 16 does not necessarily need to use the GPS signal to estimate the location of a terminal of interest as long as it is possible to estimate the location of the terminal of interest. For example, the location estimation apparatus 16 may be implemented using a signal reception circuit that receives a signal transmitted from one or more base stations or routers, and a location estimation circuit that estimates the location of the terminal 2 based on a signal strength of the signal received from the base station or the router.

(4) In the embodiments, constituent elements of the information providing system 100 may be realized by semiconductor devices such as ICs (Integrated Circuits), LSIs (Large Scale Integrations) or the like such that each constituent element may be individually realized by one chip or part or all of constituent elements may be realized on one chip. Furthermore, the technique of implementing the integrated circuit is not limited to the LSI, but the integrated circuit may be realized in the form of a dedicated circuit or a general-purpose processor. The integrated circuit may also be an FPGA (Field Programmable Gate Array) that can be programmed after the manufacture of the LSI or a reconfigurable processor that is allowed to be reconfigured in terms of the connection or the setting of circuit cells in the inside of the LSI. When a new integration circuit technique other than LSI techniques are realized in the future as a result of an advance in semiconductor technology or related technology, the functional blocks may be realized using such a new technique. A possible example of a new technique is biotechnology.

(5) All or part of the processes in the embodiments (for example, processes shown in FIG. 11, FIG. 13, FIG. 14, and FIG. 15) may be realized using hardware such as an electronic circuit or the like or using software. When software is used, the processes are realized by executing a control program stored in a memory by a processor included in the information providing system 100. The control program may be stored in a storage medium, and the control program may be provided via the storage medium. For example, the control program may be installed in an information providing system from the storage medium, and a processor of the information providing system may execute the control program thereby causing the information providing system to perform various processes (such as those shown in FIG. 11, FIG. 13, FIG. 14, and FIG. 15).

What is claimed is:

1. A computer-implemented method, comprising:
(A) acquiring, from a questioner terminal, question information indicating a question of a questioner and question area information indicating a question area about which the question asks;
(B) acquiring, from an answerer database, pieces of answer area information respectively indicating answer areas about which answerer candidates are respectively able to answer;
(C) narrowing down terminals of the answerer candidates by using the acquired pieces of answer area information and the acquired question area information, to select one or more answerer terminals from among all of the terminals of the answerer candidates as selected answerer terminals resulting in all of the terminals of the answerer candidates as consisting of the selected answerer terminals and non-selected answerer terminals;

(D) after selection of the one or more answerer terminals, transmitting, exclusively to the selected answerer terminals, the acquired question information;

(E) acquiring, from at least one of the selected answerer terminals, at least one piece of answer information indicating at least one answer given to the question by at least one answerer;

(F) transmitting, to the questioner terminal, the acquired piece of answer information; and (G) adding, into a question-answer database, the acquired at least one piece of answer information in association with the acquired question information and the acquired question area information, wherein after the (A), collating the acquired question information and the acquired question area information with the question-answer database, and transmitting the acquired at least one piece of answer information, indicating a registered answer to the question, to the questioner terminal in response to the registered answer to the question being found in the question-answer database.

2. The method according to claim 1, wherein the (C) includes
  (c1) selecting, from among the answer areas, one or more answer areas each overlapping at least partially the question area; and
  (c2) selecting, from among the terminals of the answerer candidates, as the answerer terminals, one or more first terminals of one or more first answerer candidates each able to answer about at least one of the selected answer areas.

3. The method according to claim 1, wherein the (C) includes
  (c1) selecting, from among the answer areas, one or more answer areas each overlapping at least partially the question area; and
  (c2) selecting, from among the terminals of the answerer candidates, one or more first terminals of one or more first answerer candidates each able to answer about at least one of the selected answer areas; and
  (c3) in response to a number of the first terminals being greater than or equal to a prescribed number, narrowing down the first terminals to one or more second terminals as the answerer terminals, based on priority information concerning the first terminals and/or the first answerer candidates.

4. The method according to claim 3, wherein the (C) further includes
  (c4) in response to the number of the first terminals being smaller than the prescribed number, selecting, from among the answer areas, one or more additional answer areas located within a distance range from the question area, and adding, into the answerer terminals, one or more additional terminals of one or more additional answerer candidates able to answer about the selected additional answer areas.

5. The method according to claim 1, further comprising:
in response to a number of the acquired at least one piece of answer information being less than a prescribed number, wherein the prescribed number is greater than one, selecting, from among terminals of the answerer candidates, one or more additional answerer terminals different from the answerer terminals selected in the (C), by relaxing a selection condition more than that in the (C); and transmitting, to the selected additional answerer terminals, the acquired question information.

6. The method according to claim 1, further comprising:
before the (A), causing the answerer candidates to register the respective answer areas into the answerer database in advance.

7. The method according to claim 1, wherein in (A), the question area information is GPS location information acquired by the questioner terminal.

8. A computer comprising:
a processor; and
a memory storing a program causing the processor to execute the method according to claim 1.

9. A system including a server, a questioner terminal, and terminals, wherein
the server includes a processor and a memory storing a program causing the processor to execute the method according to claim 1.

10. A non-transitory storage medium storing a program causing a computer to execute the method according to claim 1.

11. The method according to claim 1, wherein after the (F),
(G) determining whether a chat conversation has been performed in the past with the at least one answerer.

12. The method according to claim 11, wherein
  (H1) generating a chat-format image so as to follow a content of the chat conversation performed previously when it is determined that the chat conversation has been performed in the past.

13. The method according to claim 11, wherein
  (H2) generating a new chat-format image when it is determined that the chat conversation has not been performed in the past.

14. The method according to claim 3, wherein
in the (c3), the priority information is determined based on the degree of matching between a first chat language of the first user registered in advance in the answerer terminal and a second chat language of the second user registered in advance in the questioner terminal.

* * * * *